U. S. DANIEL.
ATTACHMENT FOR MOTOR VEHICLES.
APPLICATION FILED MAR. 14, 1919.
1,312,956.
Patented Aug. 12, 1919.
2 SHEETS—SHEET 1.
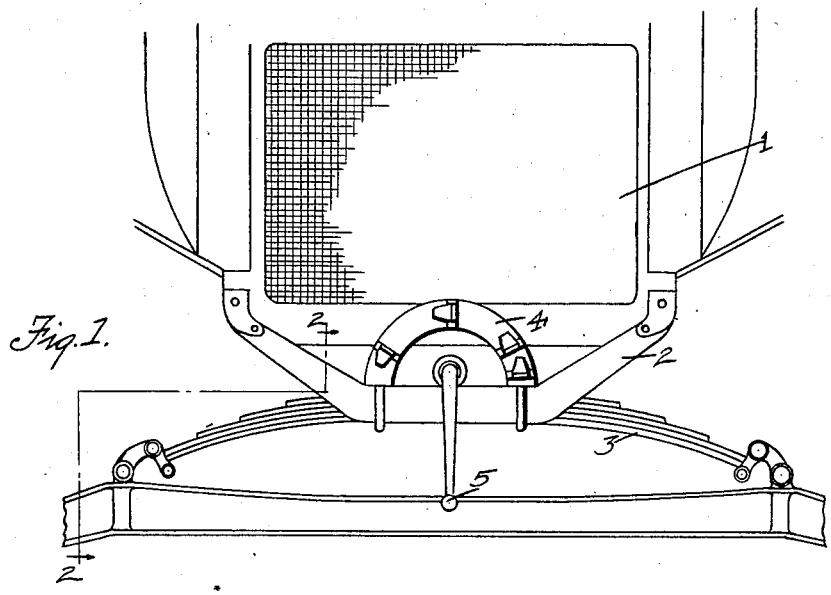
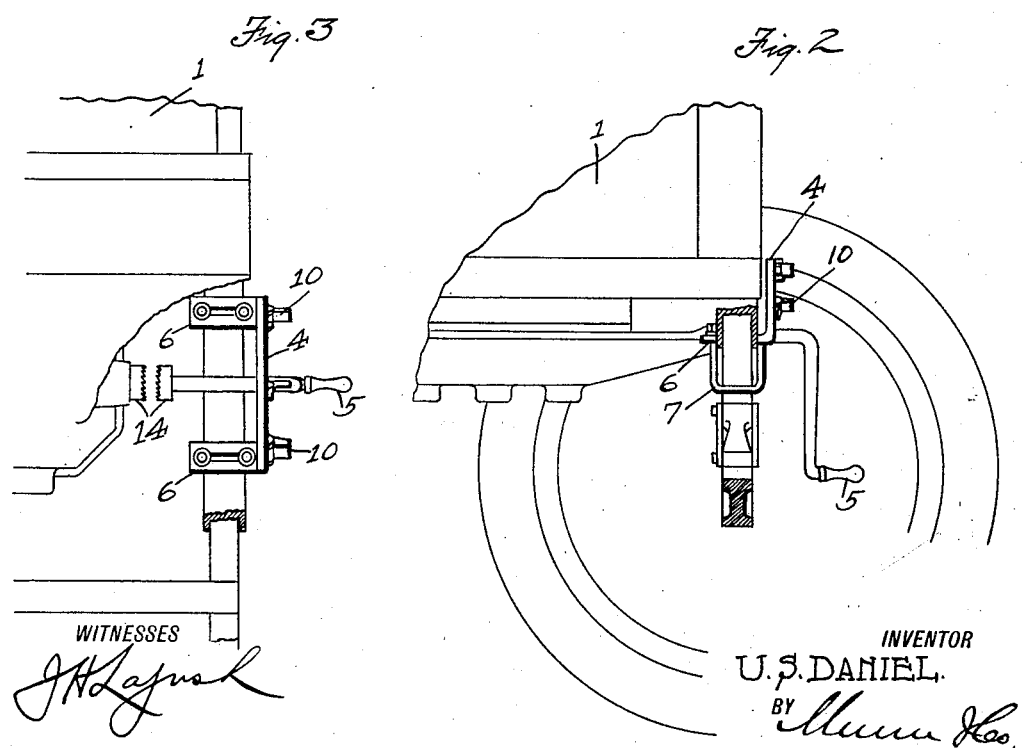
INVENTOR
U. S. DANIEL.
BY
ATTORNEYS U. S. DANIEL.
ATTACHMENT FOR MOTOR VEHICLES.
APPLICATION FILED MAR. 14, 1919.
1,312,956.
Patented Aug. 12, 1919.
2 SHEETS—SHEET 2.
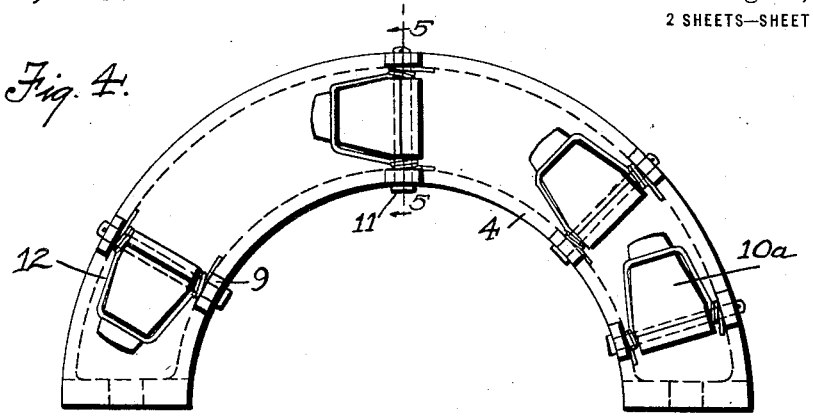
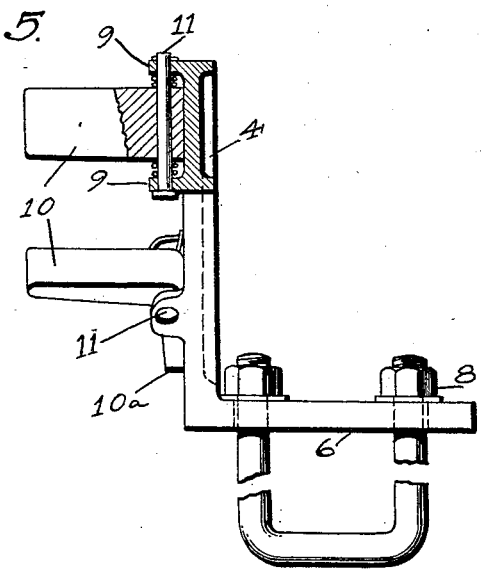
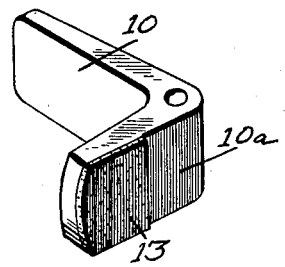
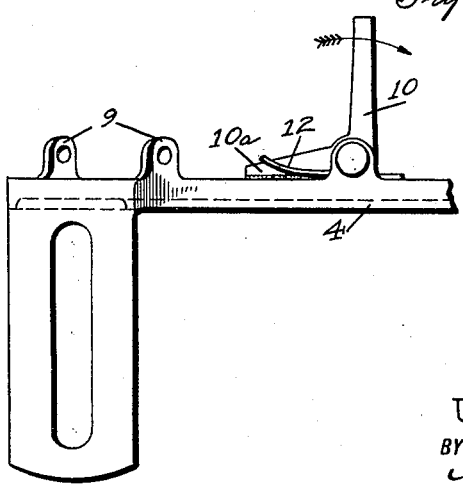
WITNESSES
INVENTOR
U. S. DANIEL
BY
ATTORNEYS

UNITED STATES PATENT OFFICE.

ULYSSES S. DANIEL, OF BEAUMONT, TEXAS.

ATTACHMENT FOR MOTOR-VEHICLES.

1,312,956.   Specification of Letters Patent.   Patented Aug. 12, 1919.

Application filed March 14, 1919. Serial No. 282,712.

*To all whom it may concern:*

Be it known that I, ULYSSES S. DANIEL, a citizen of the United States, and a resident of Beaumont, in the county of Jefferson and State of Texas, have invented certain new and useful Improvements in Attachments for Motor-Vehicles, of which the following is a specification.

My invention is an improvement in attachments for motor vehicles, and has for its object to provide a device of the character specified especially adapted for use with Ford cars, but capable of attachment to other cars, wherein means is provided for preventing reverse movement of the crank, in back firing and the like, the said means being normally operative to prevent reverse movement, but interfering in no way with the forward movement of the crank.

In the drawings:

Figure 1 is a front view of a portion of an automobile provided with the improvement;

Fig. 2 is a section on the line 2—2 of Fig. 1;

Fig. 3 is a bottom plan view;

Fig. 4 is a front view of the improvement detached;

Fig. 5 is a section on the line 5—5 of Fig. 4.

Fig. 6 is a top plan view of one end of the attachment;

Fig. 7 is a perspective view of one of the holding pawls.

The present embodiment of the invention is shown in connection with a motor vehicle 1, being secured to the bracket 2 which connects the body of the vehicle to the front spring 3. The attachment includes an arc shaped plate 4 which is secured to the body of the bracket 2, the said body being channel shaped, and the central portion of the spring fitting therein, and the plate 4 is attached to the body of the bracket, upon each side of the crank 5.

The plate which is approximately semicircular and channel shaped in cross section, as shown in Fig. 5, has at each end a laterally extending longitudinally slotted lug 6. A U-shaped clip 7 is connected with each of these lugs, the arms of the clip passing through the slot and being engaged by nuts 8 above the lug. The clips 7 embrace the body of the bracket, the lug 6 resting upon the upper face of the bracket, and the clips also embrace the portion of the spring which is arranged within the bracket.

The plane of the plate is vertical, and upon its front face the plate has a series of pairs of forwardly extending lugs 9, the members of each pair being at opposite edges of the plate. A pawl is mounted between each pair of lugs, each pawl being an angle piece consisting of two portions 10 and $10^a$, extending at approximately a right angle with respect to each other, and the pivotal connection of the pawl with the lugs is at the junction of the portions, a pivot pin 11 being passed through registering openings in the lugs and in the pawl at this point.

A spring 12 is provided for normally holding each pawl with the arm $10^a$ in contact with the plate 4 and with the other arm 10 substantially perpendicular thereto. These springs are formed from wire of suitable gage bent into substantially U-shape, and having at each end a coil which embraces the pin between the lugs and the pawl. The ends of the spring rest upon the plate 4, and the body of each spring engages the arm $10^a$ of the pawl, holding it against the plate 4. Each pawl has upon the outer face of the arm $10^a$ a facing 13 of cushioning material, as, for instance, felt or the like, and all of the pawls are similarly arranged to yield when the crank swings forwardly, but to obstruct the return movement of the crank that is, the arm 10 of each pawl may swing freely toward the plate 4 to permit the passage of the crank in the forward motion, the arm $10^a$ swinging up from the plate, but should the engine backfire and the crank swing reversely, it will engage that face of the arm 10 of the adjacent pawl, and will swing the arm $10^a$ more tightly into contact with the plate, thus presenting a rigid stop to the reverse movement of the crank.

In the present instance four pawls are provided, the arrangement being such that the crank cannot swing but a short distance under backfire until it engages a pawl. When the crank is in its outward position, that is, with the clutch sections 14 out of engagement as shown in Figs. 2 and 3, the handle of the crank will be out of position to engage the pawls. Only when the crank is moved to engage the clutch sections is the handle in position to engage the pawls.

By means of the clips, the attachment may be easily connected with a car or removed therefrom.

I claim:

1. In a motor vehicle, the combination with the crank, of an attachment for preventing reverse movement thereof, said attachment comprising a substantially semicircular plate having means at its ends for connecting the same to the vehicle on opposite sides of the crank, means on the forward face of the plate for preventing reverse movement of the crank when in engaged position and for permitting the free forward movement thereof, said means comprising a series of pawls, each consisting of two arms extending at approximately a right angle, and pivoted to the plate at the junction of the arms, springs normally holding the pawls with one arm in contact with the plate and with the other substantially perpendicular thereto, the pawls being similarly arranged, and a facing of cushioning material upon that arm of each pawl which engages the plate.

2. In a motor vehicle, the combination with the crank, of an attachment for preventing reverse movement thereof, said attachment comprising a substantially semicircular plate having means at its ends for connecting the same to the vehicle on opposite sides of the crank, means on the forward face of the plate for preventing reverse movement of the crank when in engaged position and for permitting the free forward movement thereof, said means comprising a series of pawls, each consisting of two arms extending at approximately a right angle, and pivoted to the plate at the junction of the arms, and springs normally holding the pawls with one arm in contact with the plate and with the other substantially perpendicular thereto, the pawls being similarly arranged.

3. An attachment for motor vehicles for preventing reverse movement of the crank, said attachment comprising pawls each consisting of two arms extending at approximately a right angle, a support to which the pawls are pivoted at the junction of the arms, and springs normally holding the pawls with one arm in contact with said support and the other substantially perpendicular thereto, the pawls being similarly arranged.

ULYSSES S. DANIEL.

Witnesses:
JNO. D. MELAD,
HOMER C. DANIEL.

Copies of this patent may be obtained for five cents each, by addressing the "Commissioner of Patents, Washington, D. C."